Feb. 20, 1962        D. H. FISH        3,022,478
RESISTANCE TEMPERATURE SENSING DEVICE
Filed Sept. 11, 1959
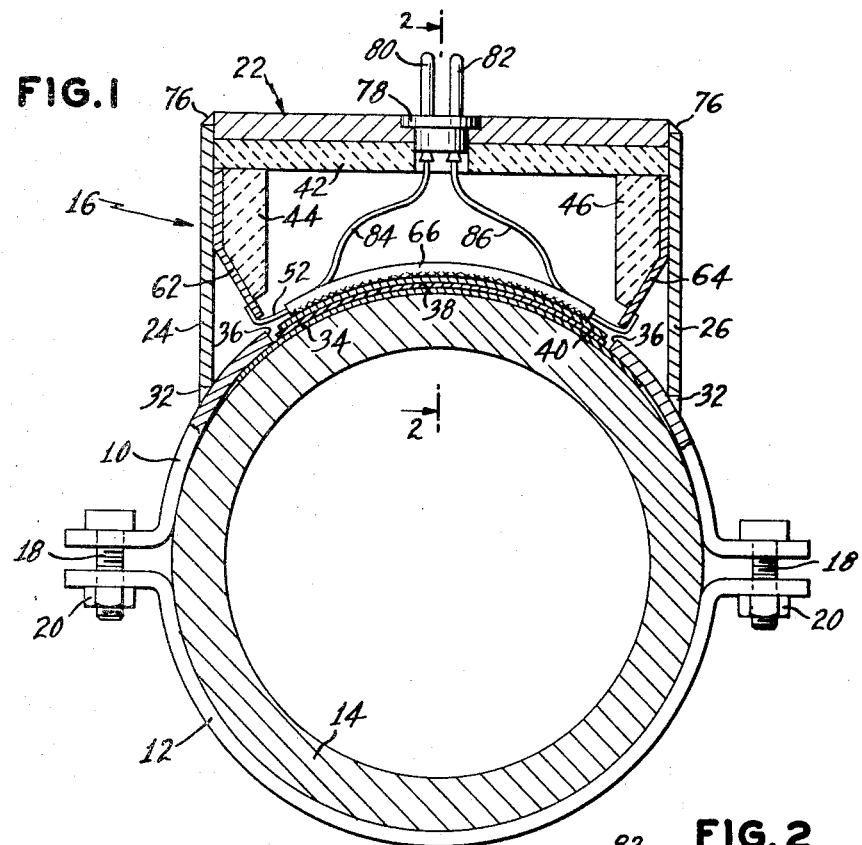
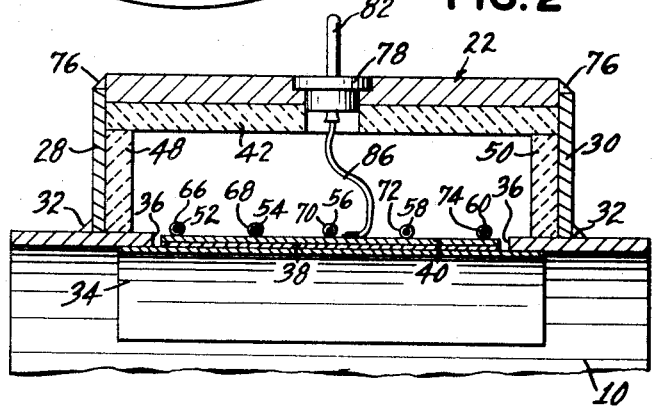
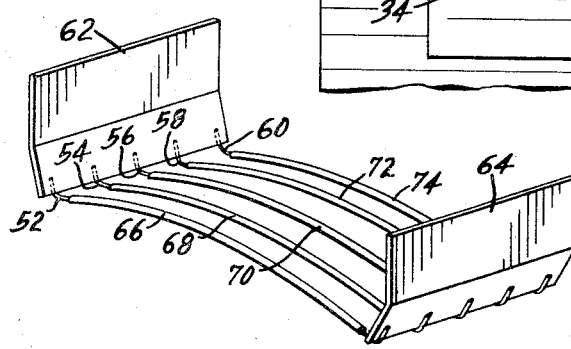
INVENTOR.
DONALD H. FISH
BY Karl Huber
James E. Bryan
Alan C. Rose
ATTORNEYS United States Patent Office 3,022,478
Patented Feb. 20, 1962

3,022,478
RESISTANCE TEMPERATURE SENSING DEVICE
Donald H. Fish, Livingston, N.J., assignor, by mesne assignments, to Engelhard Industries, Inc., Newark, N.J., a corporation of Delaware
Filed Sept. 11, 1959, Ser. No. 839,448
5 Claims. (Cl. 338—31)

This invention relates to resistance temperature sensing devices and, more particularly, to such units for measuring the temperature at the surface of a pipe.

Various types of a sensing unit for resistance temperature measuring devices have been suggested in which the resistance wire is supported by or forms part of a woven structure. The resistance wire may form either the warp or the woof of a fabric of which the other component, i.e. the woof or the warp, consists of a suitable insulating fiber material, such as asbestos. Another sensing unit is obtained by interlacing the resistance wire into a previously prepared fabric of insulating fiber material. A sensing unit of the latter type is described in Edward P. Anderson's co-pending application Serial No. 637,481, filed January 31, 1957, now Patent No. 2,926,320, granted February 23, 1960, and a product having a similar structure of a resistance temperature sensing wire, supported by a woven refractory is disclosed in co-pending application Serial No. 703,266, filed December 17, 1957, by the same inventor.

The present invention makes use of the type of sensing unit mentioned in the foregoing paragraph and, for the purpose of this specification, it will be termed a "sheet-like resistance temperature sensing unit." In spite of the fact that most such units contain woven material, this is not necessarily the case. As an example, the sensing unit according to the mentioned application Serial No. 703,266, may exhibit a felted structure interlaced with the resistance wire. The essential characteristic is the fact that the wire is supported by a flat, sheet-like structure, and it is contemplated that any of the various types of such sensing units may be used as a component of this invention.

Sensing units as described above have been developed for and used in connection with devices for measuring the temperature of surfaces. Generally, in order to secure the unit to the surface of which the temperature must be measured, cement is used which is applied in a generous quantity at first to the surface itself and then to the sensing unit in contact with the coated surface to secure one to the other and thereby impart strength to the assembly.

However, this method of cementing results in a number of disadvantages, two of which having a special importance with regard to the requirements for use in the nuclear field. The cement generally constitutes a mass of material of low heat conductivity and in cases where an extremely fast response was required, these assemblies failed to satisfactorily operate. Furthermore, and since the cements used usually contained refractory material, they were brittle either from the beginning or they became brittle due to repeated exposure to high temperature. When applied to surfaces which were subject to vibrations or mechanical shock, the cement loosened up and, as a result, the device failed to operate properly or to indicate the correct temperature.

In many cases, and especially in the nuclear field, where fast response to temperature changes are a necesary requirement, heretofore probes have been used which are mounted in the wall of the container, pipe or the like which holds the medium of which the temperature must be monitored. More specifically, the temperature of cooling fluids used in nuclear reactors is generally controlled by probes. However, this type of device necessitates the provision of apertures through the wall and the method is objectionable because of the danger of leakage and the interference with fluid flow.

Accordingly, it is a principal object of this invention to improve resistance temperature sensing assemblies for applications where fast response, and resistance to vibration and shock are important factors. Eliminating the use of cement and thereby increasing the resistance to vibration as well as the response speed of resistance temperature detectors are collateral objects of this invention.

It is a further and more specific object of this invention to provide a fast responding, vibration-proof resistance temperature sensing device for removable mounting on a pipe for measuring the temperature on the pipe surface. Consequently, other objects of this invention are the avoidance of apertures through the pipe in devices where the temperature of the pipe contents must be controlled, for example in nuclear reactors, and the provision of a "strap-on" resistance temperature detector with improved high response speed and vibration characteristics.

In accordance with one specific embodiment of this invention, a strap-on resistance temperature detector for pipes includes a housing having a heat transmissive window formed by a cut-out in a concave, cylindrical wall and a thin metal sheet seam-welded across the cut-out opening and generally following the curvature of the cylindrical wall. The housing forms part of a conventional clamp including a pair of cylindrically bent straps to encompass the pipe for which the device is intended, so that the metal sheet window is forced against the pipe surface. The remaining inner walls of the housing are heat-insulated by means of a thick lining of refractory material, preferably of a non-brittle material such as that known in the art under the trade name of "Transite." Other refractory materials may also be employed as the lining material. As mentioned above, the sensing unit mounted in the housing is a sheet-like resistance temperature sensing unit and has the desired essentially flat structure obtained by interweaving, interlacing or the like, a temperature responsive resistance wire into a fabric. If the sensing unit is insulated itself, as for example, by a thin layer of varnish, it may be placed directly on and in surface contact with the inner surface of the sheet metal window. Generally, these units consist mainly of the woven fabric resistance wire assembly and, in this case, one or more thin mica sheets are placed between the sheet metal window and the unit itself to avoid short-circuiting the otherwise bare sensing wire windings.

It will be apparent from the foregoing that with the sheet-like sensing unit placed in surface contact with the mica sheet or directly with the sheet metal window, the other surface of the sensing unit faces the inner space of the housing. At this point, it is noted that heretofore sensing units similarly arranged have been covered with and imbedded in a necessarily considerable layer of cement for retaining them in contact with the supporting sheet metal window.

In accordance with this invention, the objectionable use of cement is avoided and substantially the entire other surface of the sheet-like sensing unit remains in contact with the atmosphere enclosed in the housing. In this regard, it is noted that this atmosphere is generally air, but any gas or gas mixture which is not affected under operating conditions may form the inner atmosphere in the housing. Additionally, the housing includes lead-in cables for connecting the sensing unit to a registering equipment. No necessity has been established for completely sealing the housing. However, the air volume enclosed in the housing remains substantially motionless and performs as a heat-insulator which is superior to any cement used heretofore and, in addition, the air is not affected by vibrations or mechanical shock. In order to maintain the sensing unit in its position with respect to the heat-transmissive window and thereby in thermal proximity to the pipe, the invention provides at least one, preferably a plurality of individual retaining members. These may consist of insulating cords, straps or the like, extending across the inner space of the housing to contact the sensing unit and hold it, with slight pressure, against the window. It is desirable that the retaining members be in contact with only a minor fraction of the entire sensing unit surface facing the housing. The remainder, in practice by far the greater portion, remains uncovered and in contact with the atmosphere in the housing. It is noted that, in the case of an insulated sensing unit, metal may be used as the material for the retainers. Sensing units with bare resistance wires on the surface require the use of insulating retainers.

Accordingly, and as a principal feature of this invention, a resistance temperature detector includes a sheet-like sensing unit having one of its surfaces in contact with a heat-transmissive support which permits mounting the unit in thermal proximity to an object of which the temperature must be measured, the arrangement being made in such a manner that almost the entire other sensing unit surface is maintained in contact with a predetermined, substantially motionless volume of air. In other words, the heat-insulation, preventing for example cooling off the unit by heat conduction, is achieved by the provision of an air pocket. While in some cases such an air or gas pocket may be provided by parts of the device into which the resistance temperature detector is built-in, generally the predetermined motionless volume of air is defined by the inner space of a housing forming part of the assembly.

More specifically, and as another feature of this invention, a resistance temperature detector includes a heat transmissive window having an extended surface and a sheet-like resistance temperature sensing unit which is held against the surface of the window solely by a suitable retaining structure for applying mechanical pressure to the side of the sensing unit away from the window, so that the use of cement is avoided. If desired, a thin layer of insulating material such as mica may be placed between the window and the sensing unit.

According to another important feature of this invention, the result described above is obtained by means of retaining members which maintain the sensing unit in thermal proximity with the object of which the temperature must be monitored, but are in contact with a mere fraction of the sensing unit surface. Additional features include the provision of the predetermined motionless atmosphere by means of a substantially closed, preferably lined housing, brackets in the housing for supporting retainers in the form of metal wires extending through insulating sleeves of flexible heat-resisting material, suitably in a parallel arrangement and contacting the inside surface of the sensing unit to retain it in its position with respect to the supporting window.

Other objects, features and advantages of the invention will become apparent from a consideration of the following detailed description and from the drawings, in which:

FIGURE 1 is a cross-sectional view of one embodiment of a strap-on resistance temperature detector when mounted on a pipe;

FIGURE 2 is a longitudinal sectional view along the line 2—2 of FIGURE 1, with the pipe removed; and FIGURE 3 is a detail view of the retainer assembly of FIGURES 1 and 2.

Referring to FIGURES 1 and 2, the drawing illustrates a conventional clamping device including two half-cylindrical shells 10 and 12 secured to a pipe 14, the upper shell 10 supporting a housing which holds the resistance temperature detector and which is generally designated by the reference numeral 16. The dual clamping device is removably secured to the pipe 14 by means of bolts 18 and nuts 20 and may be reinforced in any conventional manner known in the art.

The housing 16 is formed by a suitably square box including four side walls and a cover 22. The two longitudinal side walls 24 and 26 appear in FIGURE 1, whereas the other pair is designated by the numerals 28 and 30 in FIGURE 2. By welding the four side walls to the upper shell 10 along the line 32, the shell forms part and partly constitutes one wall of the housing. A square cut-out is provided in the shell 10 and a thin stainless steel sheet 34 of somewhat greater surface area than the cut-out is welded all around the edge 36 formed by the shell 10. An air-tight, heat-transmissive window is thereby obtained which, with its outer concave side, contacts the outer surface of the pipe 14 upon tightening the nuts 20.

In the embodiment illustrated herein it is assumed that a sensing unit consisting of a woven fabric or the like interlaced with a temperature responsive resistance wire is used in which the bare wire appears at both surfaces. For this reason, a thin mica sheet 38 is arranged in surface contact with the steel window 34. As mentioned above, when an insulated sensing unit is used, the mica sheet 38 may be omitted. The sheet-like resistance temperature sensing unit 40 is shown supported by the mica sheet 38 with its lower surface in contact with the mica. An insulated sensing unit would rest directly on the window 34. In both cases, the sensing unit is maintained in thermal proximity to the pipe surface for fast response considering that, in practice, a steel sheet window about 0.005 inch thick may be used, while the thickness of the mica sheet may be about 0.001 inch.

In accordance with the invention, the upper of the two surfaces of the sensing unit 40, termed the "first surface" in the following and designated by the numeral 41 (FIGURE 2), faces the generally air-filled space inside the housing 16 and is consequently in contact with this air. Heavy, insulating linings on all surfaces improve heat insulation from the ambient atmosphere and the cover lining 42 is cemented or may be attached by screws (not shown) to the longitudinal side wall linings 44 and 46 of FIGURE 1 and to the other pair of side wall linings 48 and 50 in FIGURE 2. Defined by the lined housing walls, the air volume remains substantially at rest and it has been found that heat-insulation by this atmosphere instead by a conventional cement considerably increases the response speed of the device.

The sheet-like resistance temperature sensing unit 40 is maintained in the position shown in the drawing, in which its second surface 51 (FIGURE 2) contacts the mica sheet 38, by means of retaining members which are attached to brackets secured, in turn, to the inside walls of the housing. Each of the retaining members consists essentially of a cord formed by a metal wire core extending through a tubing. In the example illustrated herein, five such cords are shown and FIGURE 3 is a detail view of the retainer assembly before it is mounted in the housing. Five wires cut to equal length and designated by the reference numerals 52, 54, 56, 58 and 60 and serve as the retaining members. A pair of angularly bent strips 62 and 64 form the brackets and have one end of each wire welded to one edge as shown in FIGURE 3. Each of the wires extends through a sleeve 66, 68, 70, 72 and 74, respectively, of insulating material, suitably of fiberglass, which sleeves cover almost the entire length of the respective wire.

When assembling the device, at first the mica sheet 38 and sensing unit 40 are arranged as illustrated in FIGURE 1. Subsequently, the retainer assembly of FIGURE 3 is placed inside the housing so that the upper portion of brackets 62 and 64 contact the side walls 24 and 26, respectively, of the housing. In this position the sleeves 66, 68, 70, 72 and 74 assume a slightly curved shape. Supported by the wires 52, 54, 56, 58 and 60, respectively, they apply a slight pressure to the sheet-like sensing unit 40 and thereby retain the mica 38 sheet in thermal contact with the sheet metal window. It is noted that the mentioned gentle pressure may be derived from the resiliency of the brackets 62 and 64.

In order to complete the assembly, the brackets 62 and 64 are spot-welded to the side walls 24 and 26, respectively, and the insulating lining, consisting of the four side walls 44, 46, 48, 50 and the cover lining 42 is placed inside the housing. It has been found advantageous to use wedge-shaped insulating side linings 44 and 46 to impart the desired tension to the wires 52 through 60. Then, the cover 22 is secured to the side walls by welding along the four sides as designated by the reference numeral 76 in FIGURES 1 and 2. An insulating plug 78 with connector pins 80 and 82 provides for electrical connection from the sensing unit 40 through lead-in cables 84 and 86. In practice, the cover 22 supports a conventional adapter-plug assembly for convenient connection to a registering equipment, all of which is omitted in the drawing for the sake of simplification.

It will be apparent from the foregoing and especially from a consideration of FIGURE 2 that the greatest portion of the upper surface of the sheet-like sensing unit 40 is in contact with the air volume defined by the housing 16. It is noted that, theoretically speaking, each of the fiberglass sleeves 66 through 74 contacts the sensing unit surface along a geometrical line. In practice, and due to the resiliency of the materials involved, the contact surfaces are actually narrow bands, but still constitute only a fraction of the entire surface. Thereby heat-insulation reaches a maximum and the objectionable use of cement is avoided.

It will be noted that the retainer assembly of wire-supported fiber-glass sleeves described hereinbefore has been found especially useful in strap-on resistance temperature detectors for pipes where a cylindrically shaped window must be used to ensure surface contact with the pipe. However, various alternative structures are contemplated for retaining the sensing unit in a position in which one surface is in thermal proximity with the object of which the temperature must be monitored, while the other surface contacts an air volume defined by a housing. Linear retainers in a different, non-parallel arrangement or retainers which contact the sensing unit at discrete points distributed over the entire surface may be employed.

It will be obvious to those skilled in the art that many more modifications may be made within the scope of the present invention without departing from the spirit thereof, and the invention includes all such modifications.

What is claimed is:

1. In a resistance temperature detector for monitoring the surface temperature of a pipe, a heat-transmissive supporting sheet bent to match the shape of said pipe surface, a sheet-like resistance temperature sensing unit having first and second surfaces, a plurality of insulating heat-resistant tubes in a parallel arrangement and spaced from each other, each of said tubes being supported by a metal wire extending through it, and means for maintaining each of said tubes in contact with said first sensing unit surface to retain said second sensing unit surface in contact with said bent supporting sheet.

2. In a resistance temperature detector, a housing, a thin metal sheet mounted in a cut-out in one wall of the housing to form a heat-transmissive window, a mica sheet in said housing in surface contact with said metal sheet, a sensing unit including a resistance temperature sensing wire supported by a sheet-like insulating structure and having first and second surfaces arranged in said housing with said second surface in contact with said mica sheet, a plurality of individual insulating retaining members mounted in said housing, each of said retaining members directly contacting a fractional area of said first surface of said sensing unit, the remainder of said first sensing unit surface being exposed to and contacting exclusively the atmosphere in said housing.

3. In a device for detecting the temperature of the surface of a pipe, a housing having one wall curved to form a concave cylindrical outer surface matching said pipe surface, a thin metal sheet mounted in a cut-out in said curved wall, thereby forming a heat-transmissive window, the remaining walls of said housing being lined with heat insulating material, a sensing unit including a resistance temperature sensing wire supported by a sheet-like insulating structure having first and second surfaces arranged in said housing with said second surface in contact with but insulated from said metal sheet, a plurality of substantially parallel wire-supported insulating flexible tubes extending across the inside of said housing for maintaining said second sensing unit surface in contact with said heat-transmissive window, said first sensing unit surface having substantially its entire area exposed to the atmosphere enclosed in said housing, and clamping means including cylindrical straps encompassing said pipe for mounting said housing on said pipe with said metal sheet window contacting said pipe surface.

4. In a device for detecting the temperature on the surface of a pipe, a housing having one wall curved to form a concave cylindrical outer surface matching said pipe surface, a thin metal sheet mounted in a cut-out in said curved wall to form a heat-transmissive window, the remaining walls of said housing being lined with heat insulating material, a sensing unit including a resistance temperature sensing wire supported by a sheet-like insulating structure arranged in said housing in surface contact with but insulated from said metal sheet, and a plurality of substantially parallel wire-supported insulating flexible tubes spaced from each other and extending across the inside of said housing for applying pressure to correspondingly spaced parallel areas of said sensing unit for maintaining it in contact with said heat-transmissive window.

5. In a device for detecting the temperature on the surface of a pipe, a housing having one wall curved to form a concave cylindrical outer surface matching said pipe surface, the remaining walls of said housing being lined with heat-insulating material, a thin metal sheet mounted in a cut-out in said curved wall to form a heat-transmissive window, clamping means for removably securing said housing to said pipe with said window contacting said pipe surface, a mica sheet in said housing in surface contact with said metal sheet window, a sensing unit including a resistance temperature sensing wire supported by a sheet-like insulating structure having first and second surfaces arranged in said housing having said second surface in contact with said mica sheet, a pair of elongated brackets in said housing, each of said brackets being affixed to one inside wall of said housing facing the other bracket, a plurality of metal wires extending through the housing in a substantially parallel arrangement and spaced from each other, each of said wires having one end secured to one of said brackets, a plurality of insulating sleeves supported by said wires, each of said wires extending through a sleeve associated with it, each of said sleeves contacting said first surface of said sensing unit over a narrow band-shaped area, the remainder of said first sensing unit surface being exposed to the atmosphere defined by said housing.

References Cited in the file of this patent
UNITED STATES PATENTS

| | | |
|---|---|---|
| 2,282,441 | Whitlock | May 12, 1942 |
| 2,346,560 | Crosthwait et al. | Apr. 11, 1944 |
| 2,411,120 | Hortenau | Nov. 12, 1946 |
| 2,863,033 | Wallace | Dec. 2, 1958 |
| 2,868,935 | Howatt | Jan. 13, 1959 |